(12) United States Patent
Rothschild

(10) Patent No.: US 9,128,243 B2
(45) Date of Patent: Sep. 8, 2015

(54) MIRROR FOR MOBILE PHONE CAMERA

(71) Applicant: Michael Alan Rothschild, New York, NY (US)

(72) Inventor: Michael Alan Rothschild, New York, NY (US)

( * ) Notice: Subject to any disclaimer, the term of this patent is extended or adjusted under 35 U.S.C. 154(b) by 320 days.

(21) Appl. No.: 13/719,492

(22) Filed: Dec. 19, 2012

(65) Prior Publication Data

US 2014/0168804 A1 Jun. 19, 2014

(51) Int. Cl.
| | |
|---|---|
| *G02B 7/182* | (2006.01) |
| *G03B 17/17* | (2006.01) |
| *G03B 17/56* | (2006.01) |
| *H04N 5/225* | (2006.01) |
| *H04M 1/21* | (2006.01) |

(52) U.S. Cl.
CPC ............. *G02B 7/182* (2013.01); *G03B 17/17* (2013.01); *G03B 17/565* (2013.01); *H04N 5/2251* (2013.01); *H04M 1/21* (2013.01)

(58) Field of Classification Search
CPC .......... G02B 7/182; G02B 17/08; G02B 7/08; H04M 1/0264; H04M 1/00; H04N 7/15; H04N 5/225

USPC .......... 359/871, 872, 857; 348/241, 335, 375, 348/340, 14.08
See application file for complete search history.

(56) References Cited

U.S. PATENT DOCUMENTS

| | | |
|---|---|---|
| 7,146,200 B2 | 12/2006 | Park et al. |
| 7,425,100 B2 | 9/2008 | Castaneda et al. |
| 2006/0197863 A1 | 9/2006 | Kim |
| 2006/0261257 A1 | 11/2006 | Hwang |
| 2011/0081946 A1* | 4/2011 | Singh ............................ 359/857 |

OTHER PUBLICATIONS

Photojojo, "The Photojojo Phone Lens Series", http://photojojo.com/store/awesomeness/cell-phone-lenses/, retrieved on Jul. 13, 2012, pp. 1-2.
Photojojo, "The Super Secret Spy Lens", http://photojojo.com/store/awesomeness/candid-photography-spy-lens/, retrieved on Jul. 13, 2012, pp. 1-2.

\* cited by examiner

*Primary Examiner* — Euncha Cherry
(74) *Attorney, Agent, or Firm* — David M. Pankros, Attorney at Law

(57) ABSTRACT

A mirror for a mobile phone camera includes a body having a generally planar first side and a second side, a foot disposed on an end of the body having a first side and a second side; and a fastener disposed on the first side of the foot. The second side of the body and the second side of the foot forming a concave angle.

17 Claims, 3 Drawing Sheets

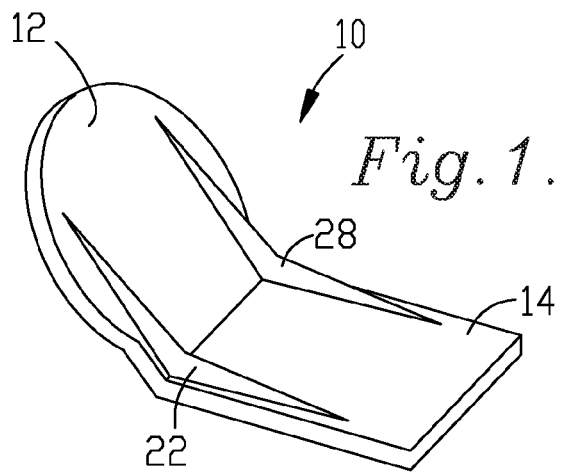
Fig.1.
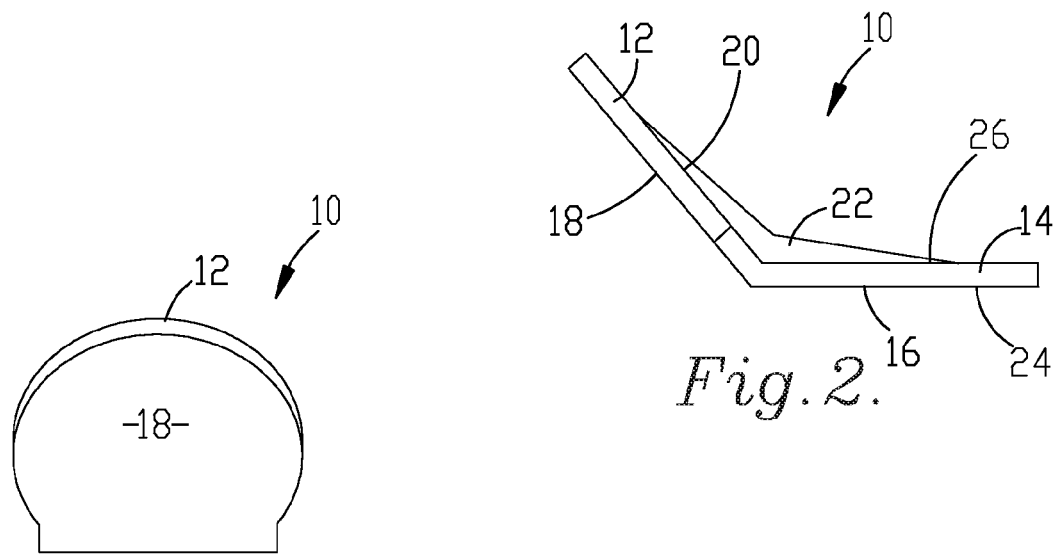
Fig.2.
Fig.3.
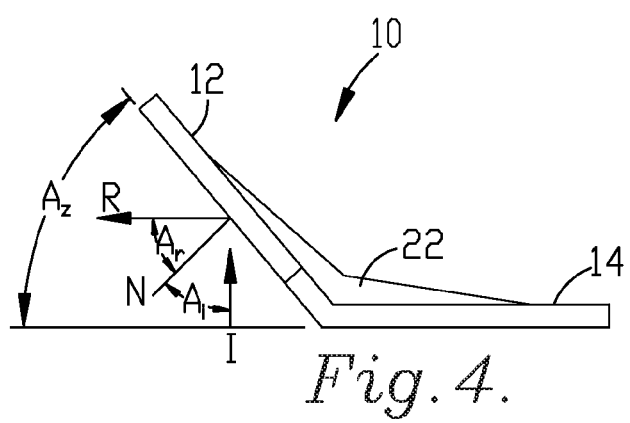
Fig.4.

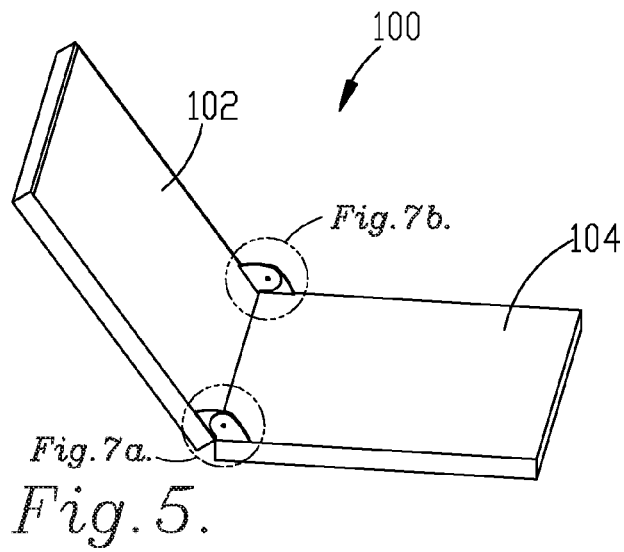
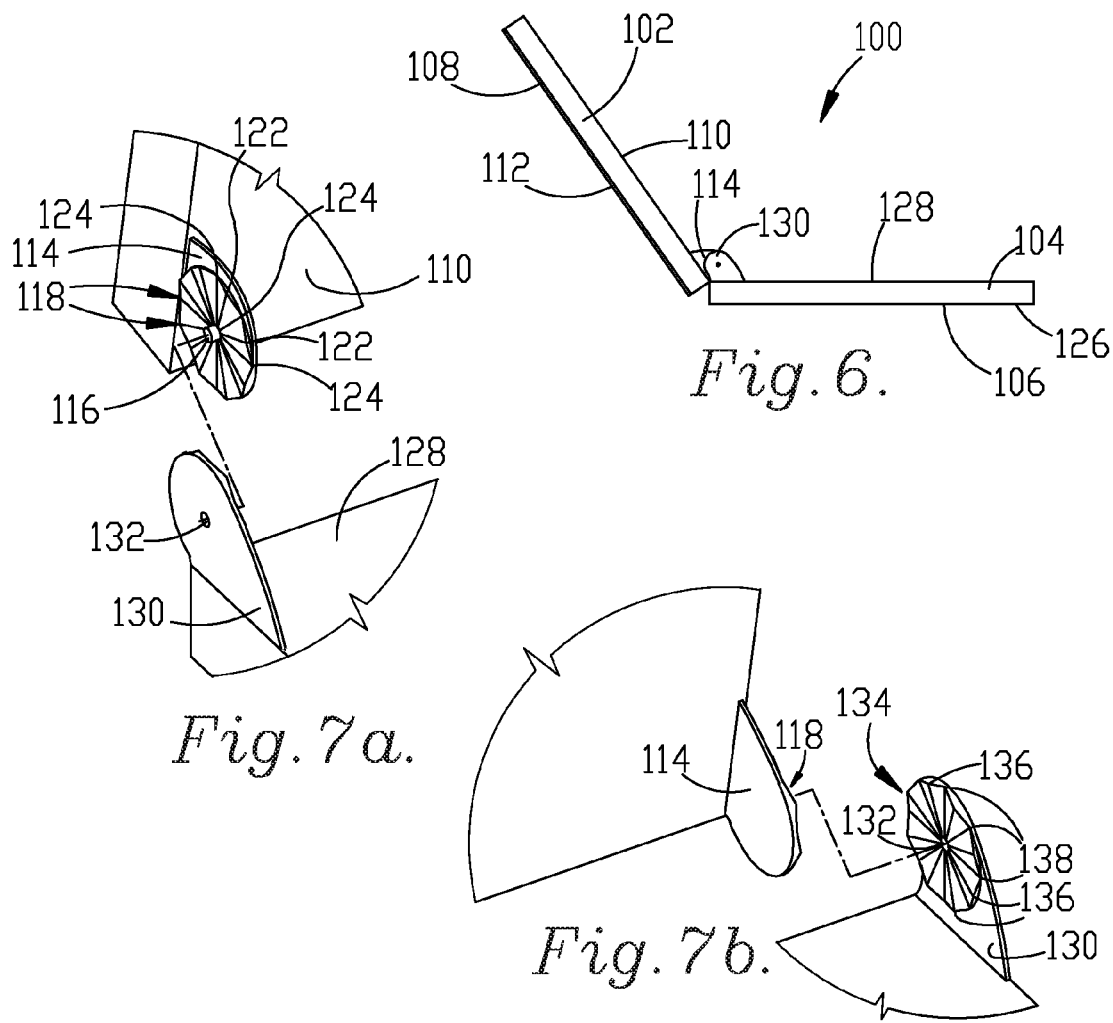

MIRROR FOR MOBILE PHONE CAMERA

FIELD OF THE INVENTION

This present invention relates to photography. More particularly, the invention relates to mirrors used to alter the capture angle of a mobile phone camera.

BACKGROUND

Cameras are used to capture photographs in nearly every imaginable situation. For almost all purposes, that a photographer is present does not change the captured subject. For example, in landscape photography, a photographer can work in the open, position a camera on a tripod and wait for the perfect moment to capture a scene without negatively affecting the resulting photographs. Similarly, portrait photographers deliberately alter the poses and expressions of their subjects to achieve a desired outcome.

For photographers who take candid or "street" photographs, however, the mere presence of a camera can cause changes to the scene. Candid photographers usually desire to capture people "as they are" rather than influencing the outcome. Typically, when people see a camera, they deliberately smile and look at the camera or, alternatively, other people may walk away because they desire to avoid being photographed. For the candid photographer, what is needed is a way to capture candid photographs of people without altering the behavior of the subjects or their pose.

SUMMARY

The present invention solves the above-described problems and provides a distinct advance in the art of photography. The problem of natural photographs is solved by utilizing an adjustable optical system on a commonplace device, such as a mobile phone. More particularly, the present invention provides a mirror for a mobile phone camera that creates the impression that the photographer is sending a text message or otherwise using the phone, based on the angle at which that phone is being held. Thus, the photographer may take photographs with a mobile phone camera without changing the behavior or pose of the subject or subjects.

In a first embodiment, the mirror includes a body, a foot, and a fastener.

The changes the capturing angle of a camera included in a mobile phone and body includes a first side and a second side. The first side of the body is reflective, like a mirror, to allow a substantial portion of light striking the surface of the first side to be reflected. The second side of the body supports the body and maintains its rigidity and position relative to the lens, and further includes a support rib. The support rib extends along the second side of the body to prevent flexing and, thereby, reduce distortion of an image reflected off of the first side of the body.

The foot supports and stabilizes the mirror on a body of the mobile phone and includes a first side and a second side. The first side stabilizes the mirror near to or substantially against the mobile phone. The second side supports the foot and maintains its rigidity and further includes the support rib. The support rib extends along the second side of the foot to prevent flexing and accidental detachment of the mirror from the mobile phone. The fastener secures the foot to a body of a mobile phone. The fastener may be removable and reattachable to allow the mirror to be temporarily removed and reinstalled.

A second embodiment of a mirror broadly comprises a body, a foot, and a fastener.

The body includes a first side, a second side, a reflector, and a first upstanding flange. The reflector is disposed on the first side of the body with a fastener.

The first upstanding flange pivotally secures the body to the foot and further includes a circular nub and a plurality of radially extending ribs. The first upstanding flange is disposed on an end of the second side of the body. The circular nub extends from a medial side of the first upstanding flange and the radially extending ribs also extend from the medial side, are concentric with the center of the circular nub, and encircle it for securing an angular position of the body relative to the foot.

The foot includes a first side, a second side, and a second upstanding flange. The second upstanding flange extends from the second side of the foot and further includes a hole and radially extending ribs. The hole matingly receives the circular nub therein and allows the body to pivot in relation to the foot. The radially extending ribs are concentric with and encircle the hole.

A third embodiment of a mirror for a mobile phone camera includes a body, a foot, and a fastener.

The foot is generally the same size and shape as the body and further includes a central aperture. The central aperture provides an opening for a lens of a mobile phone camera.

A fourth embodiment of a mirror for a mobile phone camera includes a body, a foot, a mounting ring, and a fastener.

The foot is ring-shaped and includes an arcuate flange. The mounting ring is ring-shaped and is operable to be received at least partially within the arcuate flange of the foot. Thus, the foot and the mounting ring are operable to maintain axial alignment.

In use, the body may be pushed toward the foot so the body and the foot are generally parallel allowing the mirror to be used to prevent scratches, dust, dirt, and fingerprints from accumulating on the lens of the mobile phone camera.

This summary is provided to introduce a selection of concepts in a simplified form that are further described below in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present technology are described in detail below with reference to the attached drawing figures, wherein:

FIG. 1 is a perspective view of a mirror for a mobile phone camera constructed in accordance with an embodiment of the present invention showing a body and a foot of the mirror;

FIG. 2 is an elevational view of the mirror of FIG. 1 showing a first side of the body;

FIG. 3 is an elevational view of the mirror of FIG. 1 from a side of the mirror;

FIG. 4 is an elevational view of the mirror of FIG. 1 from a side of the mirror and particularly illustrating the reflection of the capture angle of the mobile phone camera;

FIG. 5 is a perspective view of a mirror for a mobile phone camera constructed in accordance with a second embodiment of the present invention;

FIG. 6 is an elevational view of the mirror of FIG. 5 from a side of the mirror;

FIG. 7a is an exploded detail view of the mirror of FIG. 5 particularly illustrating the first upstanding flange and the second upstanding flange;

FIG. 7b is an exploded detail view of the mirror of FIG. 5 particularly illustrating the first upstanding flange and the second upstanding flange;

Figure 8:
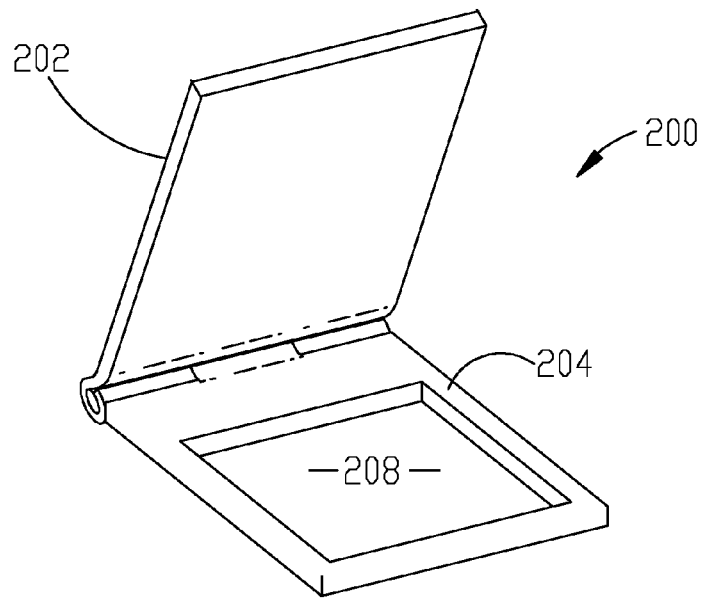
FIG. 8 is a perspective view of a mirror for a mobile phone camera in an open position constructed in accordance with a third embodiment of the present invention.

The drawing figures do not limit the present invention to the specific embodiments disclosed and described herein. The drawings are not necessarily to scale, emphasis instead being placed upon clearly illustrating the principles of the technology.

DETAILED DESCRIPTION

The following detailed description of various embodiments of the present technology references the accompanying drawings which illustrate specific embodiments in which the technology can be practiced. The embodiments are intended to describe aspects of the technology in sufficient detail to enable those skilled in the art to practice them. Other embodiments can be utilized and changes can be made without departing from the scope of the technology. The following detailed description is, therefore, not to be taken in a limiting sense. The scope of the present technology is defined only by the appended claims, along with the full scope of equivalents to which such claims are entitled.

Note that in this description, references to "one embodiment" or "an embodiment" mean that the feature being referred to is included in at least one embodiment of the present invention. Further, separate references to "one embodiment" or "an embodiment" in this description do not necessarily refer to the same embodiment; however, such embodiments are also not mutually exclusive unless so stated, and except as will be readily apparent to those skilled in the art from the description. For example, a feature, structure, act, etc. described in one embodiment may also be included in other embodiments. Thus, the present invention can include a variety of combinations and/or integrations of the embodiments described herein.

Turning now to the drawing figures and, in particular FIGS. 1-4, a mirror 10 for a mobile phone camera broadly includes a body 12, a foot 14, and a fastener 16.

In this embodiment, the body 12 is generally planar with a rectilinear end and an oval end, forming a shape similar to the silhouette of a light bulb, and includes a first side 18 and a second side 20 for changing the capturing axis R of a camera included in a mobile phone. In this embodiment, the body 12 is fabricated from plastic but, in other embodiments, the body 12 may be fabricated from metal, glass, elastomeric material, resin, fiberglass, carbon fiber, or the like.

The first side 18 of the body 12 is reflective, like a mirror, to allow a substantial portion of light striking the surface of the first side 18 to be reflected. In some embodiments, the first side 18 may be colored or may further include an additional layer adhered to, and substantially covering, the first side of the body 12 to allow the enhancement or rejection of certain wavelengths of light, or a range of wavelengths of light, such as ultraviolet, infrared, reds, blues, greens, or the like. In other embodiments, the additional layer may polarize light passing through it. In yet other embodiments, one portion of the first side 18 may be allow the enhancement or rejection of a first wavelength, or a first range, of wavelengths of light in a first portion of the first side 18 and a second potion may allow the enhancement or rejection of a second wavelength, or second range, of wavelengths of light in a second portion of the first side 18. In this way, the mirror 10 may decrease the brightness in an upper half of a photograph by partially rejecting all wavelength of light equally and the mirror 10 may leave a lower half of the photograph unaffected, for example.

The second side 20 of the body 12 supports the body 12 and maintains its rigidity and, in the present embodiment, further includes a support rib 22. The support rib 22 extends along the second side 20 of the body 12 to prevent flexing and, thereby, reduce distortion of an image reflected off of the first side 18 of the body 12.

The foot 14 extends from an end of the body 12 for supporting and stabilizing the mirror 10 on a body of the mobile phone. The foot 14 further includes a first side 24 and a second side 26. In this embodiment the foot 14 is integrally formed with the body 12 but, in some embodiments, the foot 14 may be separately formed and attached to the body 12 with a fastener such as an adhesive, a bracket, screws, bolts, pins, or the like, or a combination thereof. In this embodiment the foot 14 is fabricated from plastic but, in other embodiments, the foot 14 may be fabricated from resin, composite materials, metal, glass, or the like.

The first side 24 stabilizes the mirror 10 near to or substantially against the mobile phone. In some embodiments, the first side 24 may include bumps, ridges, or other surface features on the first side 24 of the foot 14 to matingly engage with a portion of a mobile phone or to enhance bonding or engagement with the fastener 16.

The second side 26 supports the foot 14 and maintains its rigidity and, in the present embodiment, further includes the support rib 22. The support rib 22 extends along the second side 26 of the foot 14 to prevent flexing and accidental detachment of the mirror 10 from a mobile phone.

In this embodiment, the body 12 and the foot 14 are integrally formed but, in other embodiments, they may be separately formed and joined with a fastener such as adhesive, pins, bolts, lugs, screws, or the like.

The fastener 16 secures the foot 14 to a body of a mobile phone. The fastener 16 may be a magnet, adhesive, an elastomeric band, two mating halves of a hook-an-loop-fastener, or other device capable of securing the foot 14 to a body of a mobile phone. In some embodiments, the fastener 16 is removable and reattachable to allow the mirror 10 to be temporarily removed and reinstalled.

Looking now particularly at FIG. 4, in use, the mirror 10 allows photos to be taken with a mobile phone camera at alternate angles. People tend to change their expression or smile when a camera is pointed at them. Because of this, to take candid shots, it is helpful to conceal that a photograph is being taken until after the shot is captured.

A user engages the fastener 16 to the body of the mobile phone so a viewing area of the mobile phone camera intersects with the first side 18 of the body 12. The body 12 extends from the foot 14 at an angle Az to change a capture axis of a camera in the mobile phone. The laws of reflection dictate that, in a single medium, the angle of incidence Ai of light of a reflective surface equals the angle of reflection Ar, relative to the normal of the surface N. The primary capture axis I is the primary axis of the mobile phone camera. Thus, in order to reflect the image seen by the mobile phone camera, or the modified capture axis R, 90 degrees, the first side 18 of the body 12 must be positioned at a 45-degree angle, relative to the primary capture axis I of the camera. In this case, Az is 45 degrees and the angle between the first side 18 of the body 12 and the first side 26 of the foot 14 is 225 degrees Similarly, to change the modified capture axis R 45 degrees, the first side 18 of the body 12 must be positioned at a 22.5 degree angle to the primary capture axis I of the camera. That is, angle Ai must be 67.5 degrees and, consequently, the angle Az is also 67.5 degrees. In this case, the angle between the first side 18 of the body 12 and the first side 26 of the foot 14 is 247.5 degrees. Thus, with the mirror 10 in place as described, embodiments of the present invention allow capturing photographs from a mobile phone camera without using a commonplace photography posture. Instead, the photographer may appear to be texting or using the mobile phone for a variety of tasks and subjects are unlikely to smile or otherwise change their pose.

Turning now to FIGS. 5-7, another embodiment of a mirror 100 for a mobile phone camera is illustrated. This embodiment is substantially similar to the embodiment described with reference to FIGS. 1-4, except as indicated. In this embodiment, the mirror 100 broadly comprises a body 102, a foot 104, and a fastener 106.

The body 102 includes a first side 108, a second side 110, a reflector 112, and a first upstanding flange 114. The reflector 112 is generally planar and is disposed on the first side 108 of the body 102 with a fastener such as adhesive, screws, selectively melted portions of the first side 108 and the body 102, or the like. In this embodiment, the reflector 112 is fabricated from glass but, in other embodiments, the reflector 112 may be fabricated from plastic, metal, elastomeric material, composite materials, resin, or any material capable of reflecting a substantial portion of light from its surface.

The first upstanding flange 114 pivotally secures the body 102 to the foot 104 and further includes a circular nub 116 and, in this embodiment, a plurality of radially extending ribs 118. In this embodiment, the first upstanding flange 114 is disposed on and end of the second side 110 of the body 102 and is integrally formed therewith but, in other embodiments, the first upstanding flange 114 may be separately formed and secured to the body 102 with a fastener such as an adhesive, a screw, a bolt, or the like. The circular nub 116 extends from a lateral side of the first upstanding flange 114 and the radially extending ribs 118 are concentric with the circular nub 116, and at least partially encircle it for securing an angular position of the body 102 relative to the foot 104. As best shown in FIG. 7, the radially extending ribs 118 include a plurality of points 122 and troughs 124. In this embodiment, the radially extending ribs 118 utilize a triangular profile, but, in other embodiments, the radially extending ribs 118 may utilize various profiles such as scalloped, square, trapezoidal, semicircular, or the like.

The foot 104 includes a first side 126, a second side 128, and a second upstanding flange 130. The second upstanding flange 130 extends from the second side 128 of the foot 104 and further includes a hole 132 and, in this embodiment, radially extending ribs 134 on the medial side of the second upstanding flange 130. The hole 132 matingly receives the circular nub 116 therein and allows the body 102 to pivot in relation to the foot 104. The radially extending ribs 134 are concentric with and at least partially encircle the hole 132. The radially extending ribs 134 include a plurality of points 136 and troughs 138. In this embodiment, the radially extending ribs 134 utilize a triangular profile, but, in other embodiments, the radially extending ribs 134 may utilize various profiles such as scalloped, square, trapezoidal, semicircular, or the like. In some embodiments, the radially extending ribs 134 utilize a profile that is complementary to the profile of the radially extending ribs 118.

As would be appreciated by those in the art, the circular nub 116 may be alternatively disposed in place of the hole 132 on the second upstanding flange 130 and the hole may then be disposed on the first upstanding flange 114. That is, the locations of the circular nub 116 and the hole 132 may be reversed without deviating from the scope of the invention. Further, in some embodiments, the circular nub 116 may be further replaced by an additional hole, similar to the hole 132. The hole of the body 102 is axially aligned with the hole 132 of the foot 104 and a separate fastener, such as a screw, pin, lug, bolt, or the like, may be disposed therethrough.

In yet other embodiments, the radially extending ribs 118 and the radially extending ribs 134 may be eliminated and the body 102 may be fixed in place relative to the foot 104 by friction between the first upstanding flange 114 and the second upstanding flange 130. In some embodiments, friction between the first upstanding flange 114 and the second upstanding flange 130 may be increased by tightening a fastener.

In use, this embodiment of the invention functions substantially similar to the embodiment described with reference to FIGS. 1-4, except as indicated. This mirror 100 of this embodiment allows adjustment of the angle Az before installing and while the mirror 100 is installed on a body of a mobile phone.

With the circular nub 116 engaged within the hole 132, the radially extending ribs 118 on the body 102 are operable to interlock with the radially extending ribs 134 on the foot 104 at various angular positions. Further, in some embodiments, because the first upstanding flange 114 of the body 102 and the second upstanding flange 130 of the foot 104 are operable to flex, and because the radially extending ribs 118 and the radially extending ribs 134 each have a triangular profile, the point of each radially extending rib 118, 132 is operable to fit in the trough between each rib. Applying pressure to the body 102 when the foot 104 is held or installed on a mobile phone causes the radially extending ribs 118 to slide circumferentially relative to the radially extending ribs 134 and, thus, changes the alignment of the radially extending ribs 118, 132. As each of the points 122 of each radially extending ribs 118 approaches one of the corresponding points 136 of each of the radially extending ribs 134, the first upstanding flange 114 and the second upstanding flange 130 are forced laterally away from each other. Thus, the body 102 is operable to rotate relative to the foot 104 when pressure is applied that is sufficient to cause the first upstanding flange 114 and the second upstanding flange 130 to flex. When each of the points 122 of each of the radially extending ribs 118 is received within the trough 136, the body 102 is again generally fixed in angular position. When little or no pressure is applied to the body 102, however, the body 102 remains fixed at an angular position relative to the body 104. Thus, in this embodiment, a user can adjust the angle Az, and thus the modified capture axis R.

Figure 9:
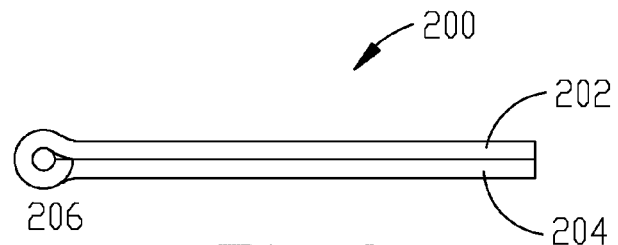
FIG. 9 is an elevational view of the mirror of FIG. 8 with the body closed against the foot.

Turning now to FIGS. 8-9, yet another embodiment of a mirror 200 for a mobile phone camera is illustrated. This embodiment is substantially similar to the embodiments described with reference to FIGS. 1-4 and 5-7, except as indicated. In this embodiment, the mirror 200 broadly comprises a body 202, a foot 204, and a fastener 206.

In this embodiment, the foot 204 is generally the same size and shape as the body 202 and further includes a central aperture 208. The central aperture 208 provides an opening for a lens of a mobile phone camera. In the embodiment shown in FIG. 8, the central aperture 208 is square but, in other embodiments, the central aperture 208 may be round, oval, octagonal, or a variety of other shapes, as dictated by the circumstances.

In use, the body 202 of the mirror 200 may be adjusted and, when a user is no longer taking photographs, the body 202 may be pushed toward the foot 204 so the body 202 and the foot 204 are generally parallel. This allows the mirror 200 to be used to prevent scratches, dust, dirt, and fingerprints from accumulating on the lens of the mobile phone camera.

Figure 10:
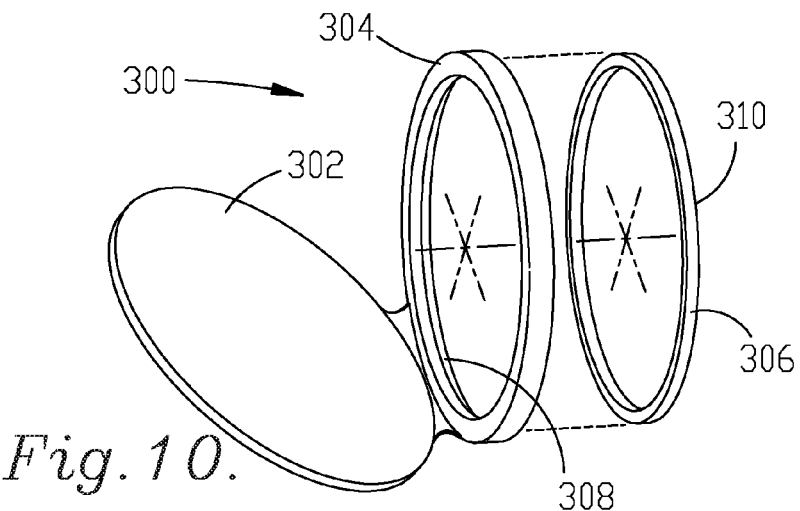
FIG. 10 is a perspective view of a mirror for a mobile phone camera constructed in accordance with a fourth embodiment of the present invention.

Turning now to FIG. 10, yet another embodiment of a mirror 300 for a mobile phone camera is illustrated. This embodiment is substantially similar to the embodiments described with reference to FIGS. 1-4, 5-7, and 8-9, except as indicated. In this embodiment, the mirror 300 broadly includes a body 302, a foot 304, and a mounting ring 306.

In this embodiment the foot 304 is generally ring-shaped and includes an arcuate flange 308 along the peripheral edge of the foot 304. The foot 304 is fabricated from metal, magnetic material, or other material that can be caused to maintain a close proximity to the mounting ring 306, as described in more detail below. The arcuate flange 308 maintains axial alignment of the foot 304 and the mounting ring 306 and may be integrally formed with the foot 304. In some embodiments, the foot 304 is separately formed and attached to the foot 304 with adhesives, weld beads, or the like.

The mounting ring 306 is generally ring-shaped for surrounding a camera of a mobile phone and further includes a fastener 310. In the embodiment shown in FIG. 10, the mounting ring 306 is fabricated from a ceramic magnetic material, but the mounting ring 306 may be fabricated from metal, magnetic material, or any other material that can be caused to maintain a close proximity to the foot 304. The fastener 310 fixes the mounting ring to an exterior surface of the mobile phone and may be glue, adhesive tape, or other device, chemical, or composition operable to fix the mounting ring 306 to the mobile phone. Additionally, the fastener 310 may be any material suitable for use as the fastener 16 of FIGS. 1-4. In some embodiments, the fastener 310 and, instead, the magnetic properties of the mounting ring 306 may be sufficient to hold the mounting ring 306 to the mobile phone.

In use, the mounting ring 306 is fixably secured to a mobile phone with the fastener 310. The foot 304 is placed proximal to the mounting ring 306 whereupon the magnetic properties of the foot 304 and/or mounting ring 306 will cause the foot 304 and the mounting ring 306 to be held in close proximity to each other. The arcuate flange 308 ensures axial alignment of the foot 304 and the mounting ring 306 by allowing the mounting ring 306 to be at least partially received within the arcuate flange 308. Thus, the foot 304 and the body 302 is operable to be easily rotated about the mounting ring 306 while maintaining axial alignment to a mobile phone camera.

Although the invention has been described with reference to the preferred embodiment illustrated in the attached drawing figures, it is noted that equivalents may be employed and substitutions made herein without departing from the scope of the invention as recited in the claims.

What is claimed is:

1. A mirror for a mobile phone camera comprising:
a body having a generally planar first side and a second side;
a foot disposed on an end of the body and including a first side and a second side;
a fastener disposed on the first side of the foot;
a mounting ring; and
an arcuate flange disposed on the foot, the mounting ring operable to be matingly received at least partially within the arcuate flange,
wherein the second side of the body and the second side of the foot form a concave angle; and
wherein the foot is ring-shaped.

2. The mirror of claim 1, further wherein the first side of the body is reflective.

3. The mirror of claim 1, further comprising:
a reflector disposed on the first side of the body,
wherein the reflector is operable to reflect a substantial amount of light from its surface.

4. The mirror of claim 1 further comprising:
a support rib extending along the second side of the body and the second side of the foot.

5. The mirror of claim 1, wherein the fastener is chosen from a group consisting of a magnet, glue, double-sided adhesive tape, and an elastomeric band.

6. The mirror of claim 1, wherein the first side of the body and the first side of the foot join at substantially a 225-degree angle.

7. The mirror of claim 1, wherein the first side of the body and the first side of the foot join at substantially a 247.5-degree angle.

8. A mirror for a mobile phone camera comprising:
a body having a first side and a second side;
a foot including a first side and a second side and pivotally connected to the body;
a first upstanding flange disposed on an edge of the body; and
a second upstanding flange disposed on an edge of the foot
the body and the foot operable to pivot to angles between 0 degrees and 180 degrees,
wherein the first side of the body is reflective.

9. The mirror of claim 8, further comprising:
a fastener disposed on the first side of the foot.

10. The mirror of claim 8, further comprising:
a first plurality of radially extending ribs disposed on a face of the first upstanding flange;
a second plurality of radially extending ribs disposed on a face of the second upstanding flange,
wherein the first plurality of radially extending ribs is operable to interlock with the second plurality of radially extending ribs.

11. The mirror of claim 8, further comprising:
a circular nub disposed on a face of the first upstanding flange; and
a hole in a face of the second upstanding flange, and
wherein the circular nub is operable to matingly engage the hole for pivotally connecting the foot to the body.

12. The mirror of claim 9
wherein the fastener is a first fastener, the mirror further comprising:
a fastener operable to allow the body to pivot around the longitudinal axis of the fastener relative to the foot, and
wherein the foot further comprises:
an upstanding flange having a central hole therethrough, and
a plurality of radial grooves extending around the central hole having radial spaces therebetween;
wherein the body further comprises:
an upstanding flange having a central hole therethrough, and
a plurality of radial grooves extending around the central hole having radial spaces therebetween; and wherein the fastener is disposed within the central hole in the body and within the central hole in the foot; and wherein the radial grooves of the body interlockingly engage within the radial spaces of the foot for securing an angular position of the body.

13. The mirror of claim 8, wherein the body and the foot are operable to pivot to angles between 0 and 90 degrees.

14. A mirror for a mobile phone camera comprising:
a body including:
- a reflective first side,
- a second side,
- an upstanding flange having a central hole therethrough, and
- a plurality of radial grooves extending around the central hole having radial spaces therebetween;

a foot including:
- a first side,
- a second side,
- an upstanding flange having a central hole therethrough, and
- a plurality of radial grooves extending around the central hole having radial spaces therebetween;

a fastener disposed within the central hole in the body and within the central hole in the foot and operable to allow the body to pivot around the longitudinal axis of the fastener relative to the foot, and a mounting ring having a central axis for attaching to a mobile phone, wherein the radial grooves of the body interlockingly engage within the radial spaces of the foot for securing an angular position of the body and wherein the foot it operable to matingly engage the mounting ring and further operable to rotate about the central axis of the mounting ring.

15. The mirror of claim 14, wherein the mounting ring is fabricated from a magnetic material.

16. The mirror of claim 14, further comprising a fastener disposed on the mounting ring for attaching the mounting ring to a body of a mobile phone.

17. The mirror of claim 14, wherein the foot is fabricated from a magnetic material.

* * * * *